(12) United States Patent
Kuhlmann et al.

(10) Patent No.: US 6,787,599 B1
(45) Date of Patent: Sep. 7, 2004

(54) ALKYL RESIN EMULSIONS AND UTILIZATION OF THE SAME

(75) Inventors: Peter Kuhlmann, Wülfrath (DE); Reinhard Winter, Wülfrath (DE)

(73) Assignee: Ashland-Südchemie-Kernfest GmbH, Wülfrath (DE)

(*) Notice: Subject to any disclaimer, the term of this patent is extended or adjusted under 35 U.S.C. 154(b) by 0 days.

(21) Appl. No.: 09/700,901

(22) PCT Filed: May 19, 1999

(86) PCT No.: PCT/DE99/01505
§ 371 (c)(1),
(2), (4) Date: Jan. 22, 2001

(87) PCT Pub. No.: WO99/60044
PCT Pub. Date: Nov. 25, 1999

(30) Foreign Application Priority Data

May 19, 1998 (DE) .......................................... 198 22 468

(51) Int. Cl.$^7$ .............................. C08J 3/00; C08K 3/20; C08L 75/00; C08F 20/00
(52) U.S. Cl. ....................... 524/591; 524/589; 524/590; 524/839; 524/840; 525/440
(58) Field of Search .......................... 525/440; 524/589, 524/591, 839, 840

(56) References Cited

U.S. PATENT DOCUMENTS

| 3,442,835 A | 5/1969 | Curtice et al. ................. 260/22 |
| 3,639,315 A | 2/1972 | Rodriquez .................... 260/22 |

FOREIGN PATENT DOCUMENTS

| DE | 43 08 188 A | 9/1994 |
| EP | 0 540 958 | 5/1993 |
| EP | 0 645 410 | 3/1995 |
| EP | 0 697 424 | 8/1995 |
| EP | 0 754 713 | 2/1997 |
| FR | 2 020 131 A | 7/1970 |

*Primary Examiner*—Patrick D. Niland
(74) *Attorney, Agent, or Firm*—IPLM Group, P.A.

(57) ABSTRACT

A two-component water paint system that allows reliable formation of essentially bubble-free paint films having a thickness of at least 120 μm. The water paint system comprises an aqueous emulsion of a hydroxy-functional alkyd resin wherein the hydroxy-functional alkyd resin can be obtained from an oleic or fatty acid component, a polyvalent alcohol, a polyether polyol having a molecular weight of 400 to 8,000, a monobasic carboxylic acid and a polycarboxylic acid or the anhydride thereof.

20 Claims, No Drawings

ALKYL RESIN EMULSIONS AND UTILIZATION OF THE SAME

The present invention relates to a two-component water paint system and a process for its production.

In conventional aqueous two-component polyurethane paints, $CO_2$ is formed in the side reaction of the isocyanate with water which leads to the undesired formation of bubbles in the paint film. According to the presently known prior art, such systems allow the reliable production of layer thicknesses of at most 60–80 μm, depending on the degree of pigmentation and the drying conditions. The two-component water paint system of the present invention on the other hand is especially characterized by low degree of bubble formation. This allows the production of layers having a thickness of at least 120 μm, often at least 150 μm without any undesired bubble formation.

Due to ecological problems and the resulting necessity of reducing solvent emissions, water-dilutable paints have been widely used and in many fields of application replaced solvent-containing paints and coatings.

For years, aqueous two-component polyurethane systems have proved to be worthwhile in those fields of application which require a high degree to weathering resistance, corrosion control and chemical resistance. These two-component systems comprise a polyol component and an isocyanate component which are mixed shortly before processing. Usually, oligomeric polyisocyanates, e.g., on the basis of hexamethylene diisocyanate and isophorone diisocyanate, are used as isocyanate components. Hydroxy-functional polyacrylate primary and secondary dispersions, water-soluble or water-emulsifiable polyester and hydroxy-functional polyurethane dispersions are primarily used as polyol components.

These paint systems are increasingly used, e.g., as automotive paints and as lacquers for plastics and furniture. In many cases, the problem of unreliability of the process prevented a more widespread application. In particular, in the case of high layer thicknesses and unfavorable climatic conditions such as, e.g., high humidity, a strong formation of bubbles takes place due to the $CO_2$ formed in the side reaction of the isocyanate with water during drying.

The object underlying the present invention is to provide a two-component water paint system showing only a low tendency to form bubbles and suitable for producing bubble-free paint layers having a thickness of at least 120 μm, preferably at least 150 μm.

This object is achieved by a two-component water paint system comprising an isocyanate component and an aqueous emulsion of a hydroxy-functional alkyd resin. The hydroxy-functional alkyd resin can be obtained from an oleic or fatty acid component, a polyvalent alcohol, a polyether polyol having a molecular weight of 400 to 8,000, a monobasic carboxylic acid and a polycarboxylic acid or the anhydride thereof.

The water paints of the present invention are suitable to be applied to different substrates such as, e.g., plastic materials, metal and wood.

Furthermore, the invention provides a process for the production of the inventive two-component water paint system, comprising:
1) providing an isocyanate component,
2) preparing an aqueous emulsion of a hydroxy-functional alkyd resin comprising:
   a) reacting an oleic or fatty acid component, a polyvalent alcohol, a polyether polyol having a molecular weight of 400 to 8,000, a monobasic carboxylic acid and a polycarboxylic acid or the anhydride thereof to obtain a hydroxy-functional alkyd resin,
   b) neutralizing the alkyd resin with ammonia or amnine,
   c) emulsifying the alkyd resin in water.

Similar alkyd resin emulsions are, in principle, already described, e.g., in U.S. Pat. No. 3,442,835; however, they have been exclusively employed as binding agents in air-drying or baking single-component paints. Single-component paints essentially differ from two-component paints in their level of quality. Two-component polyurethane paints are clearly superior to alkyd-based air-drying single-component paints in terms of mechanical properties such as flexibility and hardness but also with respect to weathering resistance, and resistance to solvents and environmental exposure (cf. *Farbe & Lack*, 2/98, page 85).

The alkyd resin of the present invention can be prepared from an oleic or fatty acid component, a polyvalent alcohol, a polyether polyol having a molecular weight of 400 to 8,000, a monobasic carboxylic acid and a polycarboxylic acid or the anhydride thereof.

Preferably, the alkyd resin comprises, 10 to 70 wt.-%, particularly preferred 15 to 40 wt.-%, of an oleic or fatty acid component, 10 to 35 wt.-%, particularly preferred 10 to 30 wt.-%, of a polyvalent alcohol having 2 to 6 hydroxyl groups, 3 to 15 wt.-%, particularly preferred 3 to 8 wt.-%, of a polyether polyol having a molecular weight of 400 to 8,000, in particular 1,000 to 6,000, 0 to 25 wt.-%, particularly preferred 10 to 20 wt.-%, of a monobasic carboxylic acid having 6 to 18 carbon atoms, and 10 to 35 wt.-%, particularly preferred 15 to 30 wt.-%, of a polycarboxylic (e.g., a dicarboxylic) acid having 4 to 10 carbon atoms or the anhydride thereof. Optionally, up to 10 wt.-% of a polybasic carboxylic acid such as, e.g., trimellitic acid or the anhydride thereof can be present in the production of the hydroxy-functional alkyd resin.

Preferably, natural oils or their fatty acids, in particular non-drying oils or their fatty acids, which are characterized by good weathering resistance and a low tendency to yellowing, are used as oleic or fatty acid components. The non-drying oils used in the present invention include all natural oils which are usually employed in the production of alkyd resins. The term 'non-drying oil' in this connection refers to a triglyceride of fatty acids which usually have 10 to 24 carbon atoms per molecule and an iodine number of <110. Mixtures are also encompassed by the present invention.

Suitable oils include vegetable oils such as apricot kernel oil, peanut oil, kapok oil, coconut oil, almond oil, olive oil, palm oil and castor oil. Peanut oil, coconut oil and castor oil are preferred.

Preferably the amount of oil used in the present invention can vary from 10 to 70 wt.-%, more preferably 15 to 40 wt.-%, of the final product.

The term 'oils' also includes esters of fatty acids with 10 to 24 carbon atoms with triols, such as trimethylolethane and trimethylolpropane, wherein the molar ratio of fatty acid to triol is 3:1. According to the present invention, the oils can be employed as such or as ester-forming precursors such as fatty acids and triols, wherein the ester is formed in situ. Furthermore, mixtures of different oils can be used as oleic or fatty acid components.

Preferably the monobasic carboxylic acid used in the present invention has 6 to 18 carbon atoms per molecule and includes saturated aliphatic acids, saturated cycloaliphatic acids and aromatic acids. Typical examples include isodecanoic acid, isooctanoic acid, cyclohexanoic acid, cyclopentanoic acid, benzoic acid, p-tert.-butylbenzoic acid and long-chain fatty acids derived from substances like coconut oil, palm kernel oil, babassu oil and other fats and oils known in the technical field. Mixtures of these acids can be used as well. Preferably, benzoic acid and p-tert.-butylbenzoic acid are used. Preferably the amount of the monobasic carboxylic acid used in the present invention is about 0 to about 25 wt.-%, more preferably about 10 to about 20 wt.-%, of the alkyd resin. Mixtures of the monobasic carboxylic acids are also encompassed by the present invention.

Preferably the polycarboxylic acids used in the present invention and their anhydrides have 4 to 10 carbon atoms per molecule and include aliphatic, cycloaliphatic and aromatic polycarboxylic acids and their anhydrides. Examples of these acids or anhydrides include maleic acid, fumaric acid, terephthalic acid, isophthalic acid, adipic acid, glutaric acid, azelaic acid and phthalic acid or the anhydrides of these compounds. Preferably the amounts thereof used in the present invention are about 10 to about 35 wt.-%, more preferably about 15 to about 30 wt.-%, of the alkyd resin. Especially preferred are phthalic acid, isophthalic acid and adipic acid as polycarboxylic acid or anhydride. Mixtures of the polycarboxylic acids or their anhydrides are also encompassed by the present invention.

Preferably the polyvalent alcohols used in the present invention have at least 2, however, not more than 6, hydroxy groups per molecule and 2 to 8 carbon atoms. Examples of these polyvalent alcohols include ethylene glycol, diethylene glycol, glycerine, trimethylolethane, trimethylolpropane, pentaerythritol, dipentaerythritol, sorbitol, mannitol and similar polyvalent alcohols which can be used for the preparation of alkyd resins. Particularly preferred polyvalent alcohols arc glycerine, pentaerythritol and trimethylolpropane. Mixtures of polyvalent alcohols are encompassed by the present invention.

Preferably in order to increase emulsifiability, about 3 to about 15 wt.-%, more preferably about 3 to about 8 wt.-%, of polyether polyols such as polyethylene glycol, polypropylene glycol or polytetrahydrofuran are incorporated in the alkyd resin. Preferably, the polyether polyols used in the present invention comprise a long chain of repeating oxyethylene units with a hydroxy group at each end of the chain. The preferred average molecular weight of the polyether polyols is about 400 to about 8,000, more preferably about 1,000 to about 6,000. Mixtures of polyether polyols are also encompassed by the present invention.

As is common in alkyd resin chemistry, the alkyd resin can be prepared in a one-step or two-step process.

In the one-step process, the oleic or fatty acid component, the monobasic carboxylic acid, the polyvalent carboxylic acid or the anhydride are esterified with the polyvalent alcohol and the polyether alcohol at temperatures from 180 to 260° C. until an acid number of 3 to 80 KOH/g, preferably 8 to 20 KOH/g, is reached.

The two-step process usually starts from the natural oil which is reacted with polyvalent alcohol at temperatures from 180 to 260° C. until the desired degree of transesterification is reached. In the second step, this reaction product is esterified with the mono and polycarboxylic acids and the polyether alcohol at 200° C. to 260° C., while water is eliminated, until an acid number of 3 to 80 mg KOH/g, preferably 8 to 20 KOH/g, is reached. The acid number can be determined by a method according to DIN 53402.

In the case that the oleic or fatty acid component is formed in situ from precursors, e.g., fatty acid and triol, a one-step process is preferred.

Preferably, the hydroxyl content of the inventive alkyd resin is 1 to 8 wt.-% based on the alkyd resin. Resins with a low hydroxyl content require smaller amounts of the expensive isocyanate for curing while resins with a high hydroxyl content require higher amounts of isocyanate, however, the latter exhibit a superior chemical resistance. As is common in the technical field, the hydroxyl content can be determined by reaction with acetic acid anhydride.

For increasing the initial molecular weight and for improving physical drying or accelerating initial drying the alkyd resin can be pre-reacted with isocyanates. However, during the modification of the hydroxy-functional alkyd resin with isocyanate no more than 30% of the available hydroxyl groups should be reacted.

Mono-, di- or triisocyanates alone or in admixture can be used for modifying the hydroxy-functional alkyd resin by pre-reacting with isocyanate. Examples of the isocyanates used in the present invention include toluene-2,4-diisocyanate, toluene-2,6-diisocyanate, 3-phenyl-2-ethylene diisocyanate, 1,5-naphthalene diisocyanate, cumene-2,4-diisocyanate, 4-methoxy-1,3-diphenyl diisocyanatc, 4-chloro-l1,3-phenyldiisocyanate, diphenylmethane-4,4'-diisocyanate, diphenylmethane-2,4'-diisocyanate, diphenylmethane-2,2'-diisocyanate, 4-bromo-1,3-phenyldiisocyanate, 4-ethoxy-1,3-phenyl diisocyanate, 2,4'-diisocyanatodiphenylether, 5,6-dimethyl- 1,3-phenyldiisocyanate, 2,4-dimethyl- 1,3-phenyldiisocyanate, 4,4'-diiso-cyanatodiphenylether, 4,6-dimethyl-1,3-phenyldiisocyanate, 9,10-anthracene diisocyanate, 2,4,6-toluene triisocyanate, 2,4,4'-triisocyanatodiphenylether, 1,4-tetramethylene diisocyanate, 16-hexamethylene diisocyanate, 1,10-decamethylene diisocyanate, 1,3-cyclohexylene diisocyanate, 4,4'-methylene-bis(cyclohexyl isocyanate), xylene diisocyanate, 1-isocyanato-3-methylisocyanato-3,5, 5-trimethylcyclohexane (isophorone diisocyanate), 1,3-bis (isocyanato-1-methylethyl)-benzene (m-TMXDI) and 1,4-bis(isocyanato 1-methylethyl)benzene (p-TMXDI). Preferably, toluene-2,4-diisocyanate, toluene-2,6-diisocyanate, diphenylmethane4,4'-diisocyanate, diphenylmethane-2,4'-diisocyanate, diphenylmethane-2,2'-diisocyanate, 1,6-hexamethylene diisocyanate and isophorone diisocyanate are used in the present invention. The reaction with isocyanate usually takes place in the temperature range from 10 to 70° C., preferably 20 to 50° C.

After neutralization with ammonia or amines, the alkyd resins according to the present invention can be emulsified in water without the addition of solvents. The resulting emulsions usually have a solids content of 20 to 70%, preferably 30 to 55%, and a pH value of 6 to 9.

Neutralization can be achieved by adding a small amount of a neutralizing agent which neutralizes a part or all of the acid groups in the resin.

Suitable neutralizing agents which can be used in the present invention include ammonia, ammonium hydroxide and primary, secondary and tertiary mono- or polyamines, including hydroxylamines and in particular low alkylamines, such as ethylamnine, butylamine, dimethylamine, diethylamine, dimethylethylaamine, dimethylisopropylamine, diethanolamine, triethanolamine, aminopropanol, dimethylarninopropanol, tributylamine, triethylamine, triisopropanolamine, ethanolamine, dimethylethanolamine or butanolamine. Amines which are volatile at temperatures below 180° C., preferably 120° C., are preferred. Especially preferred amines include ammonia, triethylamine, dimethylethylarine, dimethylisopropylarnine, dimethyl-ethanolamine, ethanolamine, diethanolamine, triethanolamine, aminopropanol and dimethylaminopropanol. The amines can be added in undiluted form wherein essentially anhydrous neutralized resin products are obtained which can be diluted with water or dispersed in water basically without restrictions. Alternatively, the resins can be neutralized by the addition of an aqueous solution or dispersion of armines. Inorganic neutralizing agents such as potassium or sodium hydroxide or carbonates can be used as well. Mixtures of neutralizing agents can also be used.

Preferably the resin is then adjusted to a certain viscosity in water and an aqueous dispersion with 5 to 55 wt.-%, more preferably 25 to 55 wt.-%, resin solids (non-volatile) is obtained.

Subsequently, the described alkyd resin emulsions can then be formulated to give pigmented or unpigmented parent paints by employing additives commonly used in the paint industry, such as pigments, filler materials and auxiliary agents.

These alkyd emulsions are characterized by excellent stability in the pH range from 6 to 9 and are very suitable for formulating aqueous two-component paints.

Shortly before processing the curing agent, i.e. the isocyanate, is added to the parent paint and mixed in either manually or mechanically to give a homogeneous mixture. The compounds listed as pre-reacting agents are suitable isocyanates. However, especially suitable are oligomeric polyisocyanates as used in conventional solvent-containing two-component polyurethane paints. They include for example pre-adducts, isocyanurates, uretdiones, allophanes and the like on the basis of hexamethylene diisocyanate, isophorone diisocyanate and toluene diisocyanate. Oligomeric polyisocyanates comprising hydrophilic components which were formulated specifically for use in water paint systems are also suitable. Such isocyanate components are for example described in the patents or patent applications EP-B 1-0 540 958, EP-B1-0 645 410, EP-A2-0 754 713 and EP-A1-0 697 424.

An organic solvent such as, e.g., an ester, a ketone or an alkylated ester of polyvalent alcohols or oligomeric polyglycols, such as methoxypropyl acetate, methoxydiglycol acetate or the like can be added to the isocyanate component in order to improve its incorporation or to decrease the viscosity. The amount of solvent is usually in the range of 10 to 40 wt.-%, based on the isocyanate.

The mixing ratio of parent paint and isocyanate curing agent depends on the number of hydroxyl groups in the polyol component and the NCO content in the isocyanate component. The stoichiometric ratio is calculated based on the basic isocyanate value, which defines the amount of polyisocyanate which is equivalent to 100 parts by weight of the hydroxy group containing components.

$$\text{basic isocyanate value} = \frac{42 \times 100 \times OH \text{ \% in the polyol component}}{17 \times NCO \text{ \% in the isocyanate component}}$$

In practice, this basic isocyanate value works as a guide value. Depending on the desired properties of the paint system, the amount of curing agent can be varied considerably. Usually, markedly higher isocyanate amounts are used in water paints since for example part of the isocyanate reacts with water to form polyureas and is then no longer available for cross-linking with the polyol component.

Depending on its composition, this mixture has a processing time from 10 minutes to 6 hours at room temperature. The paint is either cured at room temperature or under forced drying conditions like heating. The reaction can be accelerated by means of catalysts common in polyurethane chemistry, e.g. metal salts, arnines and the like.

Surprisingly, the two-component water paint systems of the present invention allow the production of paint layers with a thickness of more than 120 $\mu$m and even more than 150 $\mu$m without the formation of bubbles, even under unfavorable climatic conditions such as increased humidity. Thus, high quality coatings can be produced with the systems of the present invention which match those produced with conventional solvent-containing two-component polyurethane paint, particularly as far as resistance and mechanical properties such as for example hardness, flexibility, adhesion and the like are concerned.

The following examples illustrate the invention.

EXAMPLE 1

100 g peanut oil, 38 g polyethylene glycol, 78 g para-tert-butylbenzoic acid and 75 g pentaerythritol are heated at 230° C. for 3 hours. Then, 126 g phthalic acid anhydride and 38 g pentaerythritol are added and the reaction mixture is esterified at temperatures of 180 to 250° C., while water is eliminated, until an acid number of 10 to 20 mg KOH/g is reached. The reaction mixture is neutralized with triethylamine and emulsified in 550 g water. A finely divided emulsion with a solids content of about 45 wt.-% and a pH value of about 7 is obtained.

EXAMPLE 2

The alkyd resin emulsion obtained in, Example 1 is used to prepare a white finish according to the following formulation.

| | | |
|---|---|---|
| A | 33.3 parts by weight | alkyd emulsion from Example 1 |
| B | 27.8 parts by weight | titanium dioxide |
| C | 0.7 parts by weight | dispersion additive |
| E | 26.7 parts by weight | alkyd emulsion from Example 1 |
| F | 8.5 parts by weight | water |

The mixture of A, B and C is dispersed by means of a stirred ball mill. Then components E and F are added.

EXAMPLE 3

The parent paint prepared in Example 2 is mixed in a weight ratio of 4:1 with an isocyanate curing agent of the following composition 70 parts by weight polyisocyanate based on hexamethylene diisocyanate and 30 parts by weight methoxypropyl acetate The paint/curing agent mixture has a processing time of about 4 hours and can be processed to give a dry layer thickness of up to 180 $\mu$m without any undesired formation of bubbles due to the release of $CO_2$. Drying takes place overnight or in a forced manner for about 30 minutes at 80 to 100° C. Suitable substrates include, e.g., plastic materials, metal and wood.

EXAMPLE 4

Clear lacquer alkyd emulsion basis as furniture or parquetry sealing 87 g alkyd emulsion from Example 1

2 g flow-control additives 2 g butyldiglycol acetate and 9 g water are mixed homogeneously.

Prior to processing, the isocyanate component of Example 2 is added in a ratio of 3:1. The paint can processed up to a dry layer thickness of 150 $\mu$m without the formation of bubbles. The processing time is about 4 hours. Curing time

We claim:

1. Two-component water paint system comprising an isocyanate as the first component and an aqueous emulsion of a hydroxy-functional alkyd resin as the second component, wherein the alkyd resin can be obtained from an oleic or fatty acid component, a polyvalent alcohol, a polyether polyol having a molecular weight of 400 to 8,000, a monobasic carboxylic acid and a polycarboxylic acid or the anhydride thereof, and wherein the first component and second component are formulated to provide a paint containing at least a stoichiometric ratio of isocyanate groups to hydroxyl groups with no more than 30% of the hydroxyl groups being pre-react with isocyanates.

2. Two-component water paint system according to claim 1, wherein the hydroxy-functional alkyd resin has a hydroxyl content of 1 to 8 wt.-%.

3. Two-component water paint system according to claim 1 or 2, wherein the hydroxy-functional alkyd resin is additionally modified by reaction with isocyanate.

4. Process for the preparation of a water paint system, comprising the steps of:

A) providing an isocyanate as a first component, and

B) preparing an aqueous emulsion of a hydroxy-functional alkyd resin comprising:

i) reacting an oleic or fatty acid, a polyvalent alcohol, a polyether polyol having a molecular weight of 400 to 8,000, a monobasic carboxylic acid and a polycarboxylic acid or the anhydride thereof to obtain a hydroxy-functional alkyd resin, ii) neutralizing the hydroxy-functional alkyd resin with ammonia or amine, iii) emulsifying the hydroxy-functional alkyd resin in water to provide a second component, and iv) mixing the first component and second component to provide a paint containing at least a stoichiometric ratio of isocyanate groups to hydroxyl groups with no more than 30% of the hydroxyl groups being pre-reacted with isocyanates.

5. Process according to claim 4, wherein the hydroxy-functional alkyd resin has a hydroxyl content of 1 to 8 wt. %.

6. Process according to claim 4, wherein the alkyd resin is additionally reacted with isocyanate.

7. Process for painting a substrate using a paint system prepared according to claim 4, further comprising the step of applying the mixture of the first and second components to the substrate.

8. Process according to claim 7, wherein the mixture is applied in a film having a thickness of at least 120 µm.

9. A painted article comprising a substrate coated with an essentially bubble-free film comprising a cured paint system according to claim 1.

10. A painted article according to claim 9, wherein the film has a thickness of at least 120 µm.

11. Two-component water paint system according to claim 1, wherein the first component and second component are formulated to provide a paint whose initial isocyanate amount is greater tan or equal to a:

$$\text{basic isocyanate value} = \frac{42 \times 100 \times \text{hydroxyl \% in the second component}}{17 \times \text{isocyanate \% in the first component}}.$$

12. Two-component water paint system according to claim 1 wherein the first component contains sufficient isocyanate to react with water to form polyureas and to cross-link with the second component.

13. Two-component water paint system according to claim 1 wherein the isocyanate comprises a diisocyanate, triisocyanate or other polyisocyanate.

14. Two-component water paint system according to claim 1 wherein the isocyanate comprises a pre-adduct, isocyanurate, uretdiones or allophane based on hexamethylene diisocyanate, isophorone diisocyanate or toluene diisocyanate.

15. Two-component water paint system according to claim 1 wherein the isocyanate comprises an oligomeric polyisocyanate.

16. Two-component water paint system according to claim 1 wherein the isocyanate comprises hexamethylene diisocyanate or isophorone diisocyanate.

17. Process according to claim 4 comprising mixing the first component and second component to provide a paint whose initial isocyanate amount is greater than or equal to a:

$$\text{basic isocyanate value} = \frac{42 \times 100 \times \text{hydroxyl \% in the second component}}{17 \times \text{isocyanate \% in the first component}}.$$

18. Process according to claim 4 wherein the first component contains sufficient isocyanate to react with water to form polyureas and to cross-link with the second component.

19. Process according to claim 4 wherein the isocyanate comprises an oligomeric polyisocyanate.

20. Process according to claim 4 wherein the isocyanate comprises hexamethylene diisocyanate or isophorone diisocyanate.

* * * * *

UNITED STATES PATENT AND TRADEMARK OFFICE
CERTIFICATE OF CORRECTION

PATENT NO. : 6,787,599 B1
DATED : September 7, 2004
INVENTOR(S) : Peter Kuhlmann and Reinhard Winter It is certified that error appears in the above-identified patent and that said Letters Patent is hereby corrected as shown below:

Column 4,
Line 19, "diisocyanatc" should read -- diisocyanate --
Line 20, "4-chloro-11,3-phenyldiisocyanate" should read -- 4-chloro-1,3-phenyldiisocyanate --
Line 30, "16-hexamethylene" should read -- 1,6- hexamethylene --
Line 38, "diphenylmethane4,4´-diisocyanate" should read -- diphenylmethane-4,4´-diisocyanate --
Line 56, "ethylamnine" should read -- ethylamine --
Line 57, "dimethylethylaamine" should read -- dimethylethylamine --
Line 59, "dimethylethylarninopropanol" should read -- dimethylaminopropanol --
Line 64, "dimethylethylarine" should read -- dimethylethylamine --
Line 64, "dimethylisopropylarnine" should read -- dimethylisopropylamine --

Column 5,
Line 5, "armines" should read -- amines --
Lien 65, "arnines" should read -- amines --

Column 6,
Line 65, after "can" and before "processed" insert -- be --

Column 7,
Line 15, "pre-react" should read -- pre-reacted --

Signed and Sealed this

Ninth Day of August, 2005

JON W. DUDAS
*Director of the United States Patent and Trademark Office*

UNITED STATES PATENT AND TRADEMARK OFFICE
CERTIFICATE OF CORRECTION

PATENT NO. : 6,787,599 B1
APPLICATION NO. : 09/700901
DATED : September 7, 2004
INVENTOR(S) : Peter Kuhlmann and Reinhard Winter It is certified that error appears in the above-identified patent and that said Letters Patent is hereby corrected as shown below:

Column 3
Line 32, "arc" should read --are--
Line 52, after "80" and before "KOH/g" insert --mg--
Line 53, after "20" and before "KOH/g" insert --mg--
Line 61, after "20" and before "KOH/g" insert --mg--

Column 8
Line 9, "tan" should read --than--

Signed and Sealed this

Ninth Day of January, 2007

JON W. DUDAS
*Director of the United States Patent and Trademark Office*